(12) United States Patent
Huang et al.

(10) Patent No.: US 11,619,101 B2
(45) Date of Patent: Apr. 4, 2023

(54) EARTH AUGER

(71) Applicant: Globe (Jiangsu) Co., Ltd., Changzhou (CN)

(72) Inventors: Fei Huang, Changzhou (CN); Doushi Wang, Changzhou (CN); Zhikun Wang, Changzhou (CN); Jing Li, Changzhou (CN); Zhongjun Wang, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 0 days.

(21) Appl. No.: 17/498,753

(22) Filed: Oct. 12, 2021

(65) Prior Publication Data
US 2022/0120141 A1 Apr. 21, 2022

(30) Foreign Application Priority Data

Oct. 16, 2020 (CN) .......................... 202011107406.1
Oct. 16, 2020 (CN) .......................... 202011107420.1
Oct. 16, 2020 (CN) .......................... 202022305029.4
Oct. 16, 2020 (CN) .......................... 202022305111.7

(51) Int. Cl.
*E21B 11/00* (2006.01)
*E21B 3/02* (2006.01)

(52) U.S. Cl.
CPC .............. *E21B 11/005* (2013.01); *E21B 3/02* (2013.01)

(58) Field of Classification Search
CPC ................................... E21B 11/005; E21B 3/02
See application file for complete search history.

(56) References Cited

U.S. PATENT DOCUMENTS

| 5,358,062 A | 12/1994 | Andreas |
| 2014/0174824 A1* | 6/2014 | Schamberger ........ H02K 7/145 |
| | | 175/18 |

FOREIGN PATENT DOCUMENTS

DE 1297046 B 6/1969

* cited by examiner

*Primary Examiner* — Taras P Bemko

(57) ABSTRACT

The disclosure provides an earth auger comprising a supporting assembly, a drill pipe assembly including a drill pipe, a driving assembly arranged on the supporting assembly to drive the drill pipe assembly to work and a brake assembly including a trigger component that brakes the driving assembly and a brake lever connected through a first pivot and matched with the trigger component. The projection part of the brake lever on the plane perpendicular to the axis of the drill pipe is located outside the projection of the supporting assembly on the plane perpendicular to the axis of the drill pipe. The earth auger provided by the disclosure can effectively prevent accidents and improve the safety performance of the earth auger.

17 Claims, 7 Drawing Sheets

EARTH AUGER

CROSS REFERENCE TO RELATED APPLICATION

This application claims priority to and the benefit from the Applications No. CN202011107406.1, filed on Oct. 16, 2020, CN202011107420.1, filed on Oct. 16, 2020, CN202022305111.7, filed on Oct. 16, 2020, and CN202022305029.4, filed on Oct. 16, 2020, the disclosures of which are hereby incorporated by reference herein in their entirety for all purposes.

TECHNICAL FIELD

The disclosure belongs to the technical field of garden machinery and particularly relates to an earth auger capable of braking in time when the rotation is locked.

BACKGROUND

Earth augers are widely used in landscaping projects for seedlings on slopes, sandy and hard soils, such as planting digging, digging the outer soil of large trees, burying piles and digging holes in fences, fertilizing, digging holes for fruit trees and cultivation and weeding in landscaping projects and so on. The digging diameter of the earth auger is usually between 200 mm-600 mm, and the number of digging pits per hour is not less than 80. According to the normal 8-hour working time of a day, 640 pits can be dug, which is more than 30 times that of manual work. It can be seen that the working efficiency of earth auger is much higher than manual operation, which makes people free from heavy physical labor.

However, when drilling a hole in the ground, it may happen that the roots of the trees or the stones and other foreign objects are drilled and cause blocked rotation. At this time, there will be a great reaction torque transmitted to the operator through the earth auger. Once the reaction torque exceeds the operator's control range, it will cause the auger to lose control and an injury accident will happen.

In view of the problems mentioned above, it is necessary to provide a new earth auger to solve these problems.

SUMMARY

In view of the shortcomings of the above solution, the disclosure provides an earth auger, which can passively trigger the brake assembly when the rotation is blocked, so as to effectively prevent accidental injuries and improve the safety performance of the earth auger.

The disclosure provides an earth auger comprising: a supporting assembly, a drill pipe assembly including a drill pipe, a driving assembly arranged on the supporting assembly to drive the drill pipe assembly to work, and a brake assembly including a trigger component that brakes the driving assembly and a brake lever connected through a first pivot and matched with the trigger component. A projection part of the brake lever on a plane perpendicular to an axis of the drill pipe is located outside a projection of the supporting assembly on the plane perpendicular to the axis of the drill pipe.

The disclosure also provides an earth auger comprising: a supporting assembly, a drill pipe assembly including a drill pipe, a driving assembly arranged on the supporting assembly to drive the drill pipe assembly to work, and a brake assembly including a trigger component that brakes the driving assembly and a brake lever connected through a first pivot and matched with the trigger component. When a drill of the earth auger is blocked, the brake lever is in contact with the operator, so that the brake lever triggers the trigger component and then brakes the driving assembly.

In summary, the disclosure provides an earth auger that can passively trigger the brake assembly when the drill is blocked, thereby effectively preventing accidents and improving the safety performance of the earth auger.

DETAILED DESCRIPTION

The following describes the implementation of the disclosure through specific embodiments, and those skilled in the art can easily understand other advantages and effects of the disclosure from the content disclosed in this specification. The disclosure can also be implemented or applied through other different specific embodiments, and various details in this specification can also be modified or changed based on different viewpoints and applications without departing from the spirit of the disclosure.

It should be noted that the figures provided in this embodiment only illustrate the basic idea of the disclosure in a schematic manner. The figures only show the components related to the disclosure instead of drawing according to the number, shape and size of the components during actual implementation. The type, number and proportion of each component during actual implementation can be changed at will, and the layout of its components may also be more complicated.

The disclosure provides an earth auger that can passively trigger the brake assembly when the drill is blocked, thereby effectively preventing accidents and ensuring the operators' safety.

Figure 1:
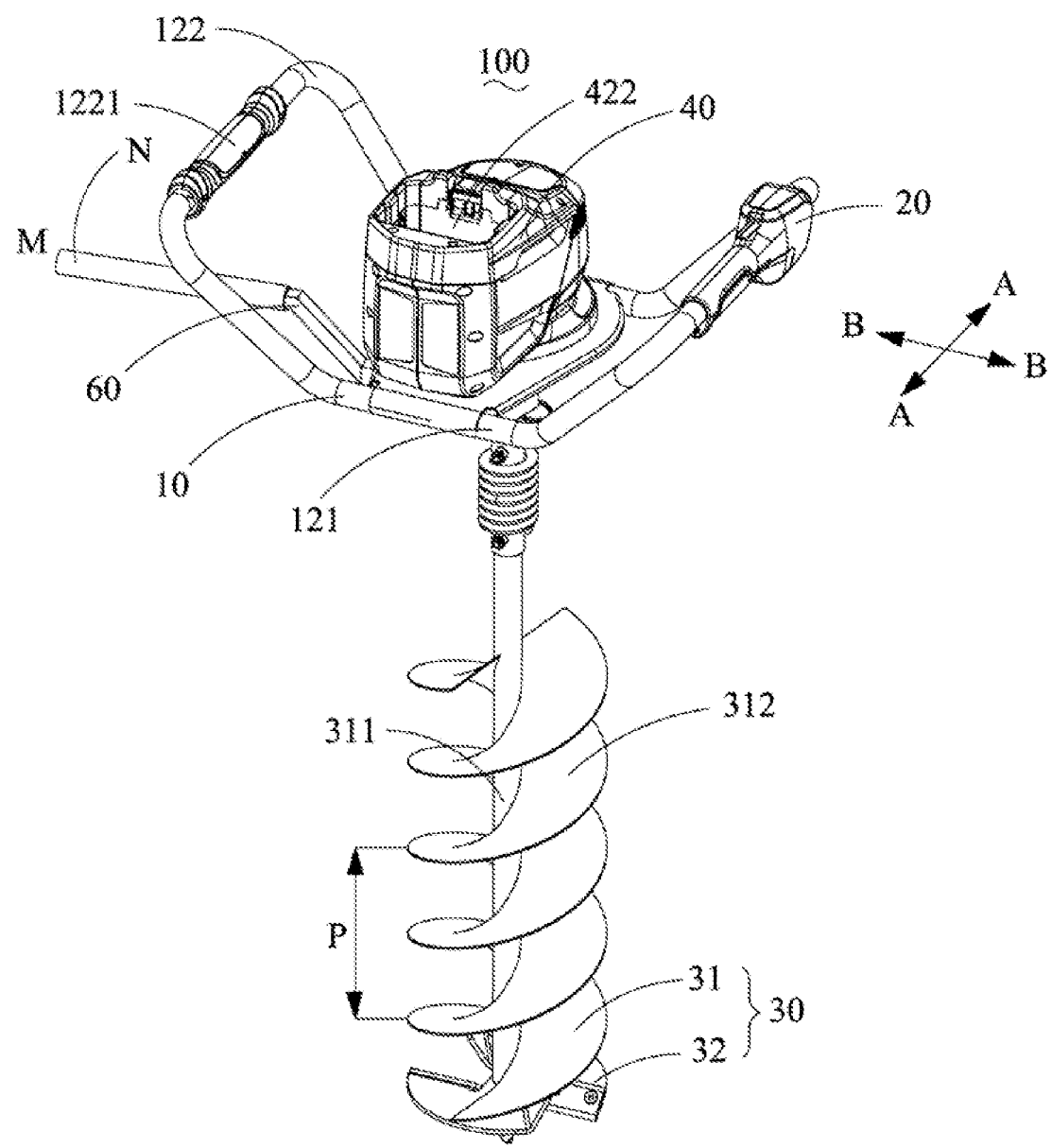
FIG. 1 is a schematic perspective view of an earth auger of the disclosure.

Please refer to FIG. 1, the disclosure provides an earth auger 100 which includes a supporting assembly 10, a handle assembly 20 mounted on the supporting assembly 10, a drill pipe assembly 30, a driving assembly 40, a lighting assembly 50 and a brake assembly 60. The driving assembly 40 can be mounted on the supporting assembly 10 to drive the drill pipe assembly 30 to work.

Figure 2:
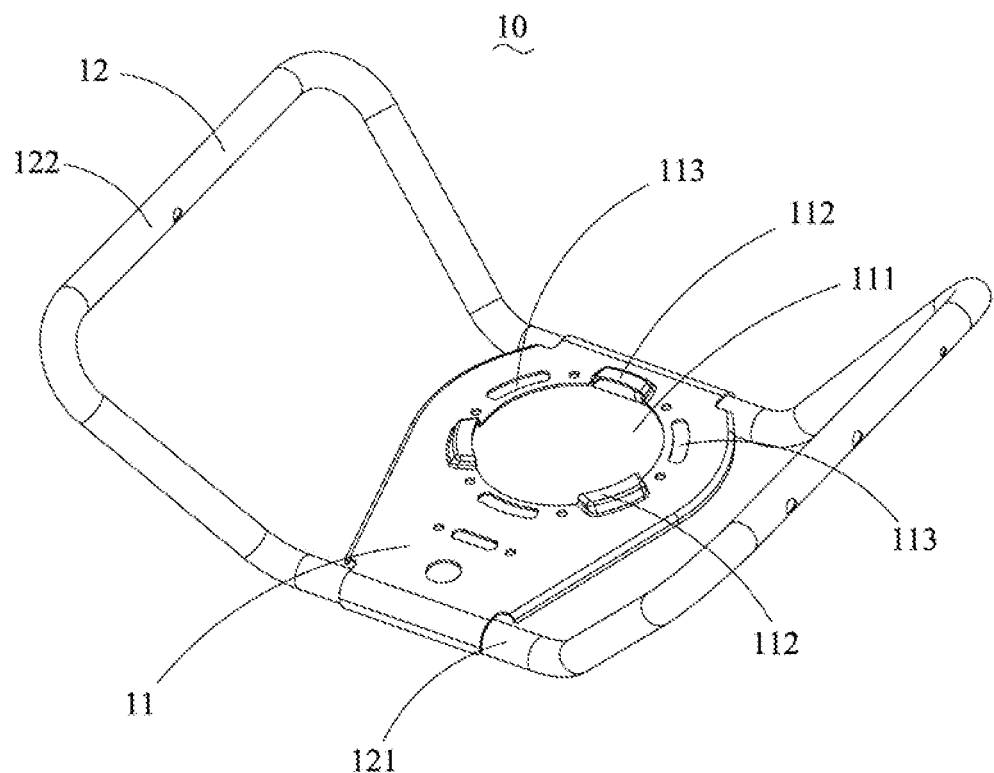
FIG. 2 is a schematic perspective view of a supporting assembly.

Please refer to FIG. 1 and FIG. 2, the supporting assembly 10 includes a supporting platform 11 and a bracket 12. The supporting platform 11 can be in the shape of a flat plate and mounted on the bracket 12. The supporting platform 11 can be provided with a through hole 111, a torque bearing component 112, and a lamp trough 113 which are matched with the driving assembly 40. The torque bearing components 112 is used to bear the torque transmitted by the driving assembly 40 to the supporting platform 11, and the number of the torque bearing component 112 can be set according to different structural requirements. When the number of torque bearing components 112 is more than one, the torque bearing components 112 are evenly distributed on the periphery of the through hole 111, so that each torque bearing component 112 bears almost equal torques and the damage to the torque bearing component 112 due to uneven torque bearing is effectively avoided. The lamp trough 113 penetrates the supporting platform 11 in a direction perpendicular to the supporting platform 11. In this embodiment, the numbers of the lamp trough 113 and the torque bearing component 112 can be three, for example. The torque bearing components 112 and the lamp troughs 113 are evenly distributed on the periphery of the through hole 11 and the torque bearing component 112 and the lamp trough 113 are set apart from each other. The bracket 12 includes a main bracket 121 and an armrest frame 122, and the armrest frame 122 is formed by bending and extending both sides of the main bracket 121. The supporting platform 11 is mounted on the main bracket 121 by screws, and a grip cover 1221 can be provided on the armrest frame 122 to improve the user's feeling.

Please refer to FIG. 2 to FIG. 5, the handle assembly 20 can be mounted on the armrest frame 122. In this embodiment, the grip cover 1221 is mounted on one side of the armrest frame 122, and a handle assembly 20 is mounted on the other side. When the earth auger 100 is in a normal working state, the handle assembly 20 is located on the armrest frame 122 held by the operator's right hand. The handle assembly 20 includes a handle shell 21, a starting unit 22, a locking unit 23 and a reversing unit 24. The handle shell 21 includes a top wall 211, a bottom wall 212 and a side wall 213. The bottom wall 212 is arranged opposite to the top wall 211. The top wall 211, the bottom wall 212 and the side wall 213 form a receiving cavity 214 for housing the starting unit 22, the locking unit 23 and the reversing unit 24. The starting unit 22 includes a trigger 221, a starting micro switch 222 and a trigger reset elastic component 223. The trigger 221 can be pivotally mounted on the handle shell 21 through a second pivot 224, and the starting micro switch 222 is matched with the trigger 221. The trigger 221 includes a handle arm 2211 and a trigger arm 2212. The handle arm 2211 and the trigger arm 2212 are located on two sides of the second pivot 224 and the handle arm 2211 passes through the side wall 213 of the handle shell 21 for user to operate. The handle arm 2211 passes through the side wall 213 facing the driving assembly 40 which is convenient for the user to operate the handle arm 2211 with the thumb when holding the handle assembly 20. The trigger arm 2212 is located in the receiving cavity 214 of the handle shell 21 and matches with the starting micro switch 222. When the user pushes the handle arm 2211, the trigger arm 2212 rotates around the second pivot 224 and resists the starting micro switch 222, so that the starting micro switch 222 can be triggered. At this time, the trigger reset elastic component 223 will undergoes elastic deformation and the starting micro switch 222 can control the driving assembly 40. When the starting micro switch 222 directly sends the starting signal to the driving assembly 40, the starting micro switch 222 directly controls the driving component 40 to work. When the starting micro switch 222 sends a starting signal to the control unit and the control unit controls the driving assembly 40 to work, the start micro switch 222 indirectly controls the driving assembly 40 to work. When the handle arm 2211 is released, the trigger 221 will be reset under the action of the trigger reset elastic component 223.

Figure 3:
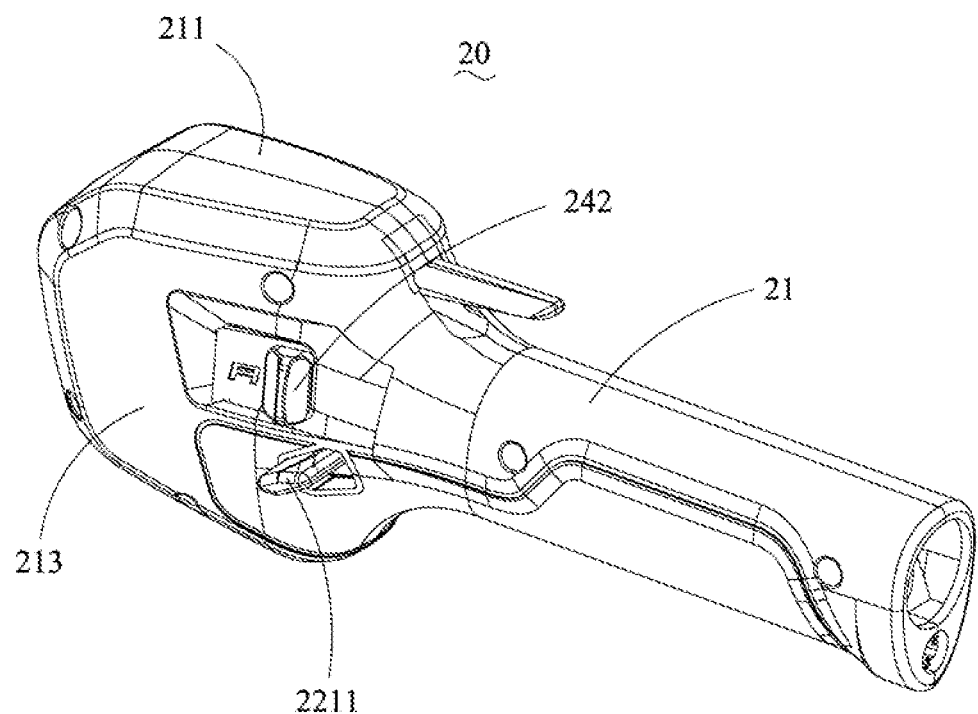
FIG. 3 is a schematic perspective view of a handle assembly.
Figure 4:
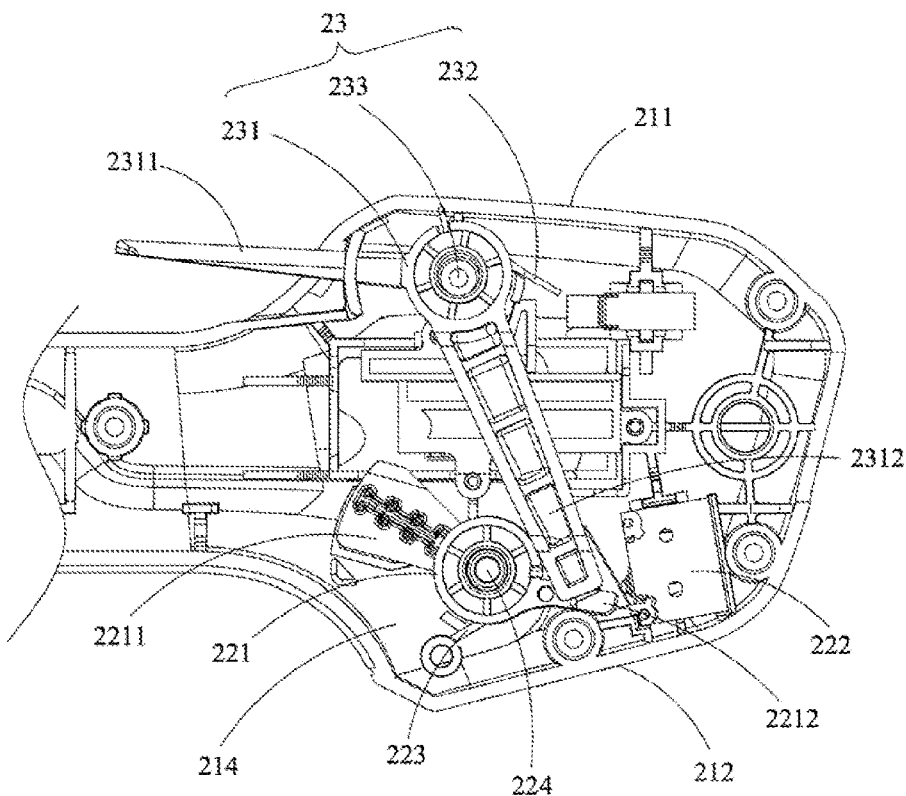
FIG. 4 is a schematic view of an internal structure of the handle assembly shown in FIG. 3.

Please refer to FIG. 3 and FIG. 4, the locking unit 23 includes a locking handle 231 and a reset elastic component 232, and the reset elastic component 232 matches with the locking handle 231. The locking handle 231 can be pivotally mounted on the top wall 211 of the handle shell 21 through a third pivot 233. The locking handle 231 includes a pushing arm 2311 and a locking arm 2312. The pushing arm 2311 and the locking arm 2312 are located on two sides of the third pivot 233 and the pushing arm 2311 passes through the top wall 211 of the handle shell 21 for user to operate. The locking arm 2312 is located in the receiving cavity 214 of the handle shell 21 and matches with the trigger arm 2212.

Figure 5:
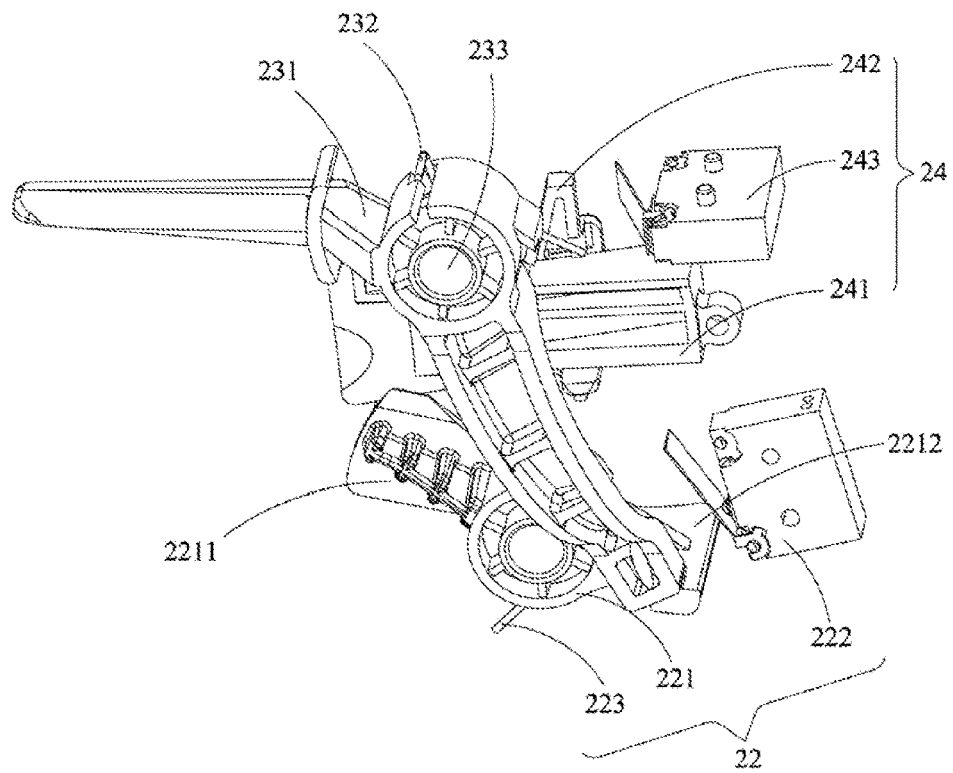
FIG. 5 is a schematic view of the match of the starting unit, the locking unit and the reversing unit.

Please refer to FIG. 5, when the locking unit 23 is in the locked state, the locking arm 2312 is in contact with the trigger arm 2212. At this time, the user cannot push the handle arm 2211, the starting unit 22 is locked by the locking unit 23 and the driving assembly 40 cannot be started. When the user pushes the pushing arm 2311 to rotate around the third pivot 233, the locking arm 2312 also rotates around the third pivot 233 and is separated from the trigger arm 2212. At this time, the locking unit 23 is in the unlocked state and the user can push the handle arm 2211 to start the driving assembly 40.

Please refer to FIG. 5 and FIG. 3, the reversing unit 24 includes a sliding rail 241, a sliding block 242 and a reversing micro switch 243. The sliding rail 241 is mounted on the side wall 213 of the handle shell 21, the sliding block 242 is slidably mounted on the sliding rail 241, and the reversing micro switch 243 matches with the sliding block 242. In this embodiment, the reversing micro switch 243 can be located above the sliding direction of the sliding block 242. When the user pushes the sliding block 242 to slide along the sliding rail 241, the sliding block 242 is in contact with the reversing micro switch 243 and triggers the reversing micro switch 243 to work. At this time, the reversing micro switch 243 sends a reversing signal to the driving assembly 40 to control the driving assembly 40 to rotate forward or reverse. The handle assembly 20 guides the operator's hand to be in a grip state through the match of the starting unit 22 and the locking unit 23 and the positions of the match of the starting unit 22 and the locking unit 23 on the handle shell 21, so that the operator can cope with sudden changes in large torques at any time, which cause the thumb triggering the trigger arm 2211 can be easily released, thereby the earth auger is braked and powered off, and the safety risk caused by the failure to release the switch in time can be avoided.

Figure 6:
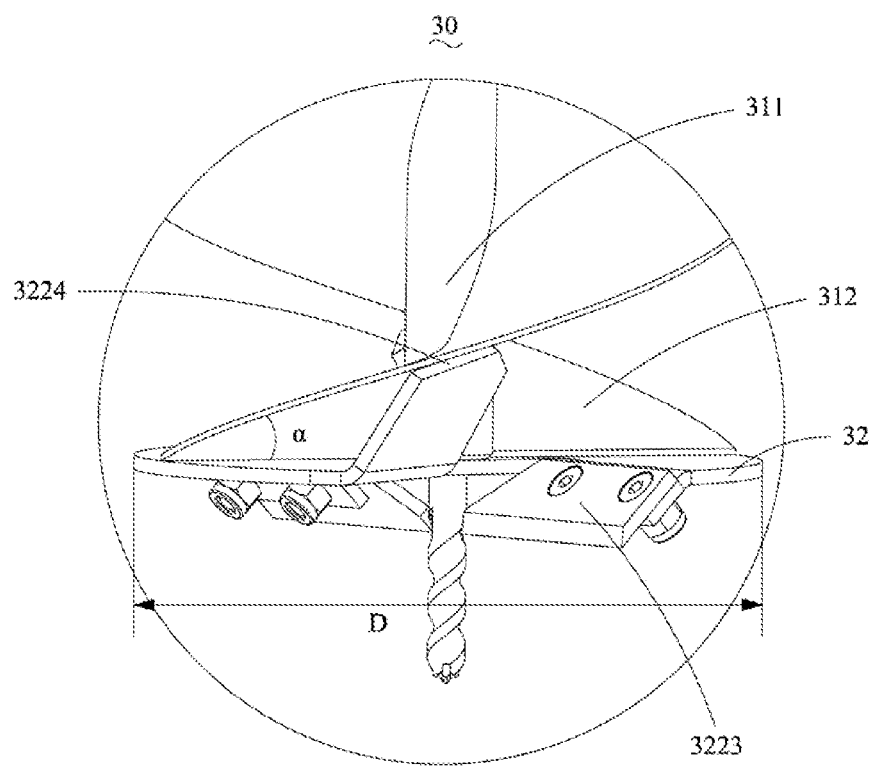
FIG. 6 is a partial schematic view of a drill pipe assembly.
Figure 7:
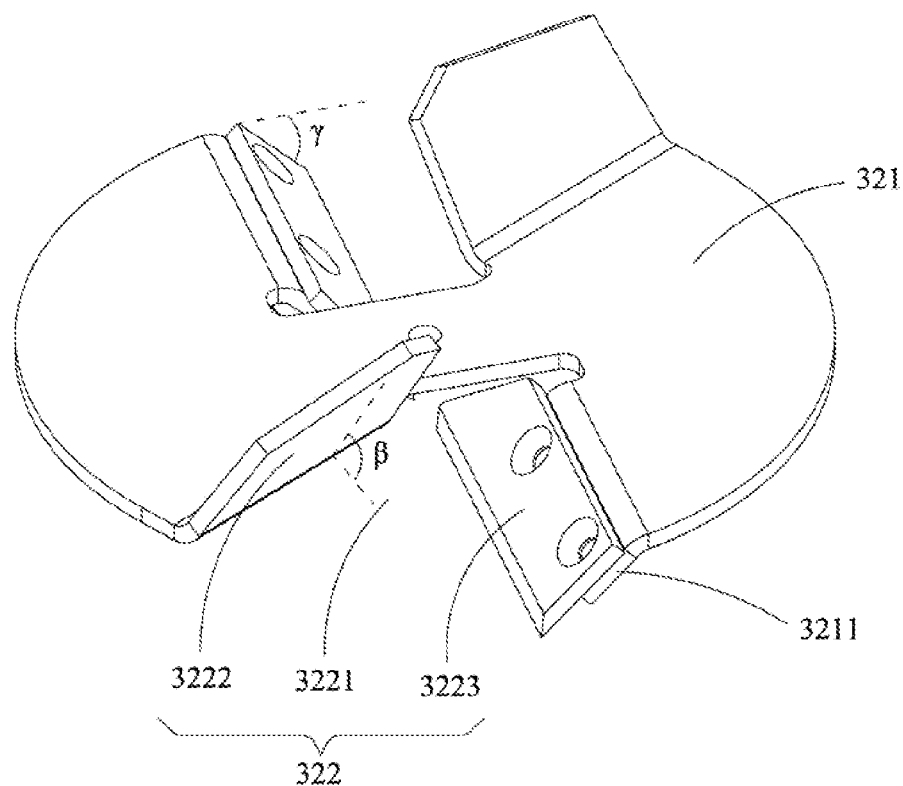
FIG. 7 is a schematic view of a structure of a splitter plate.

Please refer to FIG. 6, FIG. 7 and FIG. 1, the drill pipe assembly 30 can be mounted on the driving assembly 40 so as to work under the drive of the driving assembly 40. The drill pipe assembly 30 includes a drill pipe 31 and a splitter plate 32. The splitter plate 32 is mounted at an end of the drill pipe 31 away from the driving assembly 40. The drill pipe 31 includes a drill shaft 311 mounted on the driving assembly 40 and a spiral drill vane 312 mounted on the drill shaft 311.

Please refer to FIG. 6 and FIG. 1, the spiral angle of the spiral drill vane 312 can be a, the spiral distance can be P, and the drill diameter of the drill pipe assembly 30 is D, then the following relationship can be formed:

$$\tan \alpha = P/(\pi * D)$$

Wherein, the center of the splitter plate 32 may be provided with a shaft hole matching with the drill shaft 311, and the splitter plate 32 is mounted on the drill shaft 311 through the shaft hole. The splitter plate 32 includes a base plate 321 and a drainage unit 322. The drainage 322 can be arranged on the base plate 321. The base plate 321 can be in the shape of a circular flat plate, the diameter of the base plate 321 can be set to be equal or similar to the drill diameter D and the base plate 321 can be perpendicular to the drill shaft 311. The drainage unit 322 includes a drainage port 3221, a drainage plate 3222 and a blade 3223. The drainage port 3221 is arranged on the base plate 321, the drainage plate 3222 is arranged on one side of the drainage port 3221 and above the base plate 321, and the blade 3223 is arranged on the other side of the drainage port 3221 and below the base plate 321. The drainage plate 3222 is formed by bending and extending the side of the drainage port 3221 away from the blade 3223 upward. In this embodiment, the drainage plate 3222 and the base plate 321 are integrated, but in other embodiments, the drainage plate 3222 can also be a separate part and can be mounted on the base plate 321. The included angle β between the drainage plate 3222 and the plane of the base plate 321 is not greater than 45 degrees.

Please refer to FIG. 6 and FIG. 7, the spiral angle α of the spiral drill vane 312 is smaller than the included angle β. The base plate 321 is bent downward from the side of the drainage port 3221 away from the drainage plate 3222 to extend and form a mounting plate 3211, and the blade 3223 is mounted on the mounting plate 3221 by screws. In this embodiment, the blade 3223 is a separate component, but in other embodiments, the blade 3223 can also be integrated with the base plate 321. In this embodiment, the drainage plate 3222 and the mounting plate 3211 are manufactured through stamping and forming of the base plate 321. The included angle γ between the blade 3223 and the base plate 321 ranges, for example, from 30 degrees to 60 degrees. In this embodiment, the included angle γ between the blade 3223 and the base plate 321 can be, for example, 45 degrees.

Please refer to FIG. 6 and FIG. 7, an end of the spiral drill vane 312 close to the base plate 321 is in contact with the base plate 321. When the drill pipe assembly 30 is working, the soil and the like excavated by the blade 3223 can be continuously discharged by the spiral drill vane 312. A folded edge 3224 of the drainage plate 3222 away from the base plate 321 is tangent to the spiral drill vane 312. When the drill pipe assembly 30 is reversed to withdraw from the borehole, the drainage plate 3222 will cause that the direction of the friction force of the siltation soil to the drill pipe 31 changes, thereby facilitating the drill pipe assembly 30 to withdraw smoothly from the borehole. In this embodiment, the splitter plate 32 can be provided with two drainage units 322. The two drainage units 322 can be symmetrical about the center of the drill shaft 311, and each drainage unit 322 receives equal force, which is convenient for the user to keep the earth auger 100 in balance. The number of drainage units 322 can be set according to different structural requirements. When the number of drainage units 322 is greater than two, the drainage units 322 can be set to be rotationally symmetrical about the drill shaft 311.

Figure 8:
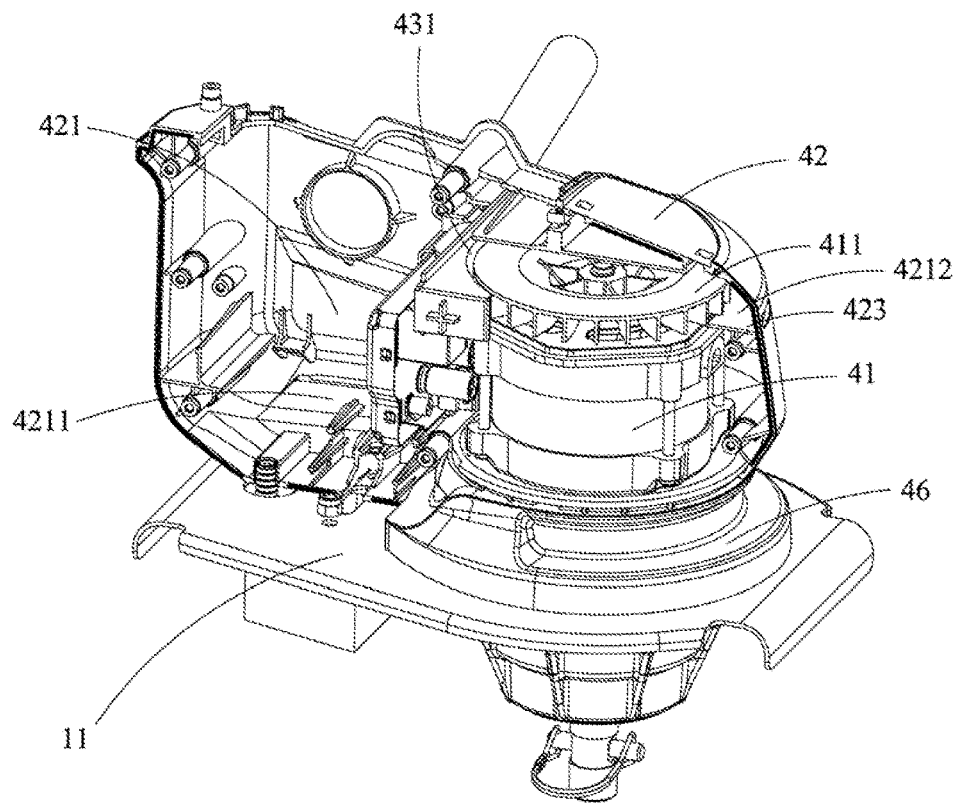
FIG. 8 is a schematic view of a structure of a driving assembly mounted on a supporting platform.
Figure 9:
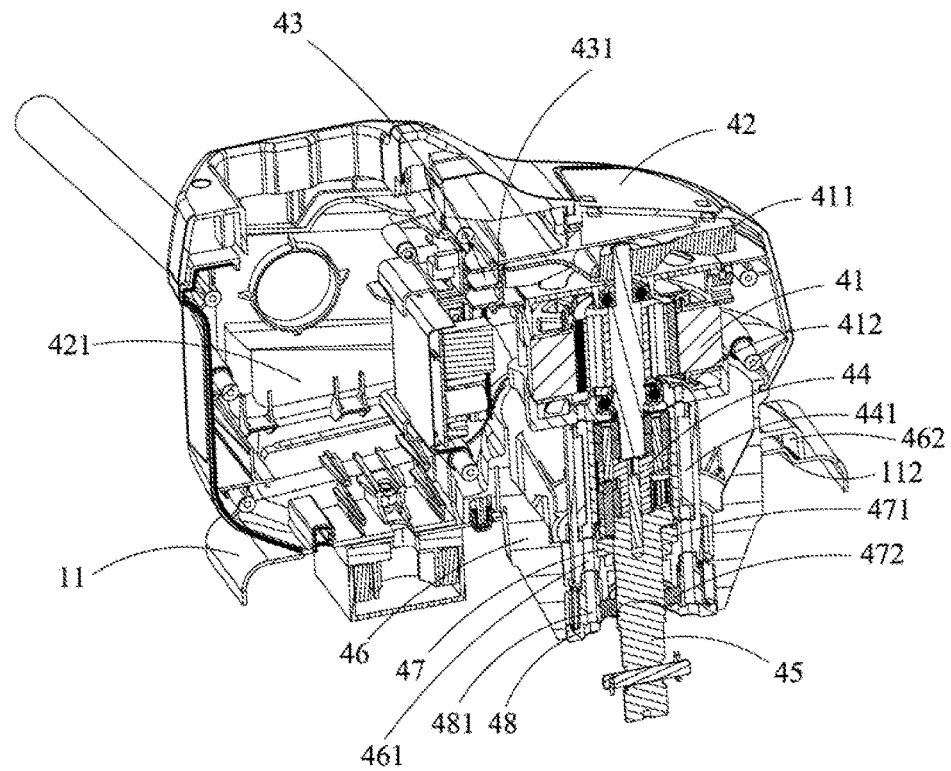
FIG. 9 is a cross-sectional view of FIG. 8.

Please refer to FIG. 8, FIG. 9 and FIG. 1, the driving assembly 40 can be mounted on the supporting platform 11 to drive the drill pipe assembly 30 to work. The driving assembly 40 includes a driving motor 41, a case 42, an air deflector 43, a gear box 44, an output shaft 45, a connecting seat 46, a bearing 47 and a bearing seat 48. The end of the driving motor 41 away from the connecting seat 46 can be provided with heat dissipation blades 411, and the motor case of the driving motor 41 is provided with a screw hole 412. The case 42 is mounted on the supporting platform 11 by screws, and matches with the connecting seat 46 to form an accommodating cavity 421. The accommodating cavity 421 can be used to accommodate the driving motor 41, the air deflector 43 and the gear box 44. The case 42 is provided with a battery slot 422 and a partition 423. The battery slot 422 is used for accommodating battery assemblies and powering the earth auger 100. In this embodiment, the battery slot 422 is located on the side of the driving motor 41 close to the operator's position, so that the distance between the operator and the drill pipe assembly 30 is maximized, thereby ensuring the operator's safety. The battery slot 422 is symmetrical about the longitudinal plane where the AA axis is located (as shown in FIG. 1). At this time, the center axis of the drill shaft 311 is located on the symmetry plane of the battery slot 422, so that the weight of the battery assemblies on both sides of the symmetry plane is equal to each other, which is convenient for operator to keep the earth auger 100 in balance. The partition 423 abuts against the motor case of the driving motor 41 and matches with the air deflector 43 to divide the accommodating cavity 421 into an air inlet cavity 4211 and an air outlet cavity 4212. The heat dissipation blades 411 of the driving motor 41 are accommodated in the air outlet cavity 4212, and the gear box 44 of the driving motor 41 is accommodated in the air inlet cavity 4211. An arc guide wall 431 is arranged on the side of the air deflector 43 facing the driving motor 41 to smoothly guide the hot air discharged from the heat dissipation blades 411 to the outside of the air outlet cavity 4212 and reduce the wind resistance of the hot air in the air outlet cavity 4212. One end of the gear box 44 is matched with the driving motor 41 and the other end is matched with the output shaft 45 to transmit the power output by the driving motor 41 to the output shaft 45. The shell of the gear box 44 is provided with a screw hole 441. The connecting seat 46 can be configured in a truncated cone shape and partially penetrate the through hole 111. The connecting seat 46 is mounted on the supporting platform 11 by screws and provided with a screw hole 461. The bearing 47 can be set on the output shaft 45 and includes a first bearing 471 located in the gear box 44 and a second bearing 472 located in the bearing seat 48. The output shaft 45 passes through the first bearing 471, the second bearing 472 and the bearing seat 48, and extends to the outside of the bearing seat 48 to match with the drill pipe assembly 30. Since the first bearing 471 can be arranged in the gear box 44 and the second bearing 472 can be arranged in the bearing seat 48, the distance between the first bearing 471 and the second bearing 472 can be maximized, which effectively ensures the output coaxiality of the output shaft 45. The bearing seat 48 can be mounted at an end of the connecting seat 46 away from the driving motor 41 and can be provided with a screw hole 481. The screw holes 412, the screw holes 441, the screw holes 461, the screw holes 481 and the screws match together to connect the driving motor 41, the gear box 44, the connecting seat 46, and the bearing seat 48 together to form a rigid overall structure, which effectively simplifies the assembly process.

Figure 10:
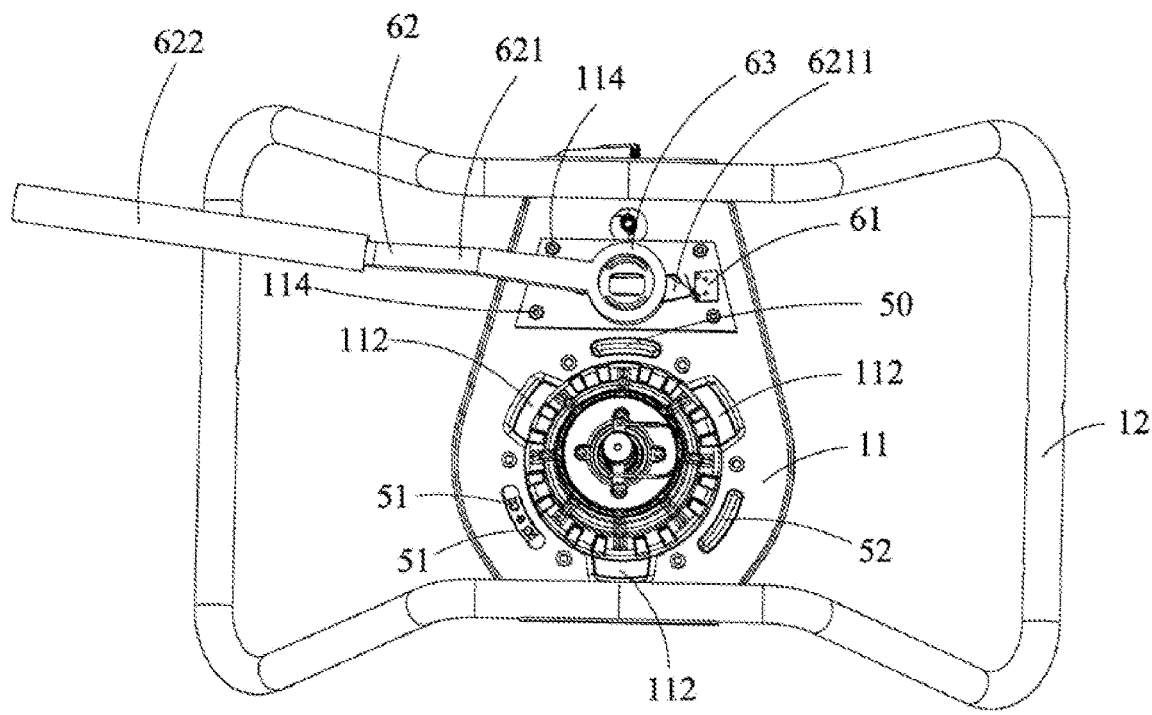
FIG. 10 is a bottom view of an earth auger with the drill pipe assembly removed.

Please refer to FIG. 9 and FIG. 10, the connecting seat 46 can be provided with a torque transmission component 462 that matches with the torque bearing component 112. When the earth auger 100 is working, the torque transmission component 462 matches with the torque bearing component 112 to bear at least part of the shear force between the supporting assembly 10 and the driving assembly 40, which improves the safety performance of the earth auger 100 and reduces the safety problems caused by the fracture of the screw due to the long-term bearing of a large shearing force. The numbers of the torque transmission component 462 and the torque bearing component 112 can be set according to different structural requirements. When the numbers of the torque transmission component 462 and the torque bearing component 112 is not less than two, the torque transmission component 462 and the torque bearing component 112 are evenly distributed around the drill pipe assembly 30. In this embodiment, the torque bearing component 112 can be a boss and the torque transmission component 462 can be a groove matching with the boss.

Please refer to FIG. 10 and FIG. 2, the lighting assembly 50 can be mounted on the connecting seat 46 to illuminate the working area. The lighting assembly 50 includes a floodlight 51 and a lampshade 52. The lampshade 52 passes through the lamp trough 113, so that the light emitted by the floodlight 51 passes through the lamp trough 113 to illuminate the working area. In this embodiment, the numbers of the lighting assembly 50 and the torque bearing component 112 are, for example, three, and the lighting assembly 50 and the torque bearing component 112 are arranged at intervals and evenly distributed around the drill pipe assembly 30.

Please refer to FIG. 10, the brake assembly 60 can be mounted on the supporting platform 11. In this embodiment, the brake assembly 60 can be mounted on the bottom of the supporting platform 11, and in other embodiments of the disclosure, the brake assembly 60 can also be mounted on the top of the supporting platform 11. The brake assembly 60 includes a trigger component 61 and a brake lever 62. The trigger component 61 is used to brake the driving assembly 40, and the brake lever 62 is pivotally mounted on the supporting platform 11 through the first pivot 63 and matches with the trigger component 61. In this embodiment, the trigger component 61 is a micro switch to send a braking signal to the driving assembly 40. A part of the projection of the brake lever 62 on a plane perpendicular to the axis of the drill shaft 311 is outside the projection of the supporting assembly 10 on a plane perpendicular to the axis of the drill shaft 311, which means that when the drill shaft 311 is perpendicular to the horizontal plane, a part of the projection of the brake lever 62 on the horizontal plane is located on the side of the bracket 12 away from the drive assembly 40. When the earth auger 100 is out of control due to a blocked rotation, as the earth auger 100 rotates, the brake lever 62 will abut against the operator's body. At this time, the trigger component 61 is triggered to work and then the driving assembly 40 is controlled to brake. In this embodiment, when the earth auger 100 is viewed from above, the drill pipe 31 of the earth auger 100 rotates clockwise and the brake lever 62 can be located on the left side of the operator which means under the left armrest frame 122. When the earth auger 100 is out of control due to blocked drill, the supporting assembly 10 rotates counterclockwise so that the brake lever 62 is in contact with the operator's body and slides clockwise to make the trigger component 61 be in a working state. In this way, the earth auger 100 can stop working under the action of the brake assembly 60. The drill pipe 31 of the earth auger 100 can also be set to rotate counterclockwise and the brake lever 62 can be located below the armrest frame 122 on the right side of the operator.

Please refer to FIG. 10, the brake lever 62 includes a rigid lever 621 and a flexible lever 622. The flexible lever 622 is located at an end of the rigid lever 621 away from the first pivot 63 to prevent the brake lever 62 from causing damage to the operator when the earth auger 100 is out of control due to the blocked rotation. The projection of the rigid lever 621 on the plane perpendicular to the axis of the drill shaft 311 is located inside the projection of the supporting assembly 10 on the plane perpendicular to the axis of the drill shaft 311, which means that when the drill shaft 311 is perpendicular to the horizontal plane, the projection of the rigid lever 621 on the horizontal plane is located on the side of the bracket 12 close to the driving assembly 40. The projection of the flexible lever 622 on the plane perpendicular to the drill axis 311 is the first projection, and the projection of the supporting assembly 10 on the plane perpendicular to the drill axis 311 is the second projection. The first projection is at least partially outside the second projection. The part of the first projection outside the second projection is on one side of the operator. In other embodiments of the disclosure, the flexible lever 622 can also be directly covered on the rigid lever 621. In this embodiment, the rigid lever 621 bends and extends from the end close to the supporting platform 11 to the end close to the flexible lever 622, so that the rigid lever 621 is, for example, Z-shaped. The rigid lever 621 is provided with a resisting arm 6211 that matches the trigger component 61, and the resisting arm 6211 and the flexible lever 622 are located on different sides of the first pivot 63. In other embodiments of the disclosure, the resisting arm 6211 and the flexible lever 622 can also be located on the same side of the first pivot 63. The supporting platform 11 can also be provided with a limiting component 114 that matches with the brake lever 62 to limit the rotation range of the brake lever 62. The brake assembly 60 can also be provided with a first elastic component (not shown) that matches with the brake lever 62. When the earth auger 100 is viewed from above, the drill pipe 31 of the earth auger 100 rotates in a clockwise direction.

Please refer to FIG. 10 and FIG. 1, when the brake lever 62 is in the first state, the brake lever 62 is in contact with the trigger component 61. At this time, the trigger component 61 controls the driving assembly 40 to brake. The moving range of the brake lever 62 is between the N position and the M position (as shown in FIG. 1). The first elastic component undergoes elastic deformation, and the brake lever 62 is at the N position at this time. When the brake lever 62 is released, the brake lever 62 is reset under the action of the first elastic component. At this time, the brake lever 62 is in the second state, it is separated from the trigger component 61 and is in the M position. In other embodiments of the disclosure, the brake lever 62 can also be configured such that the rigidity of the brake lever 62 gradually decreases from the end close to the supporting platform 11 to the end away from the supporting platform 11. When the brake lever 62 is in contact with the operator due to blocked rotation, since the rigidity of the part of the brake lever 62 in contact with the operator is relatively small, it will not cause injury to the operator when it is braked.

Figure 11:
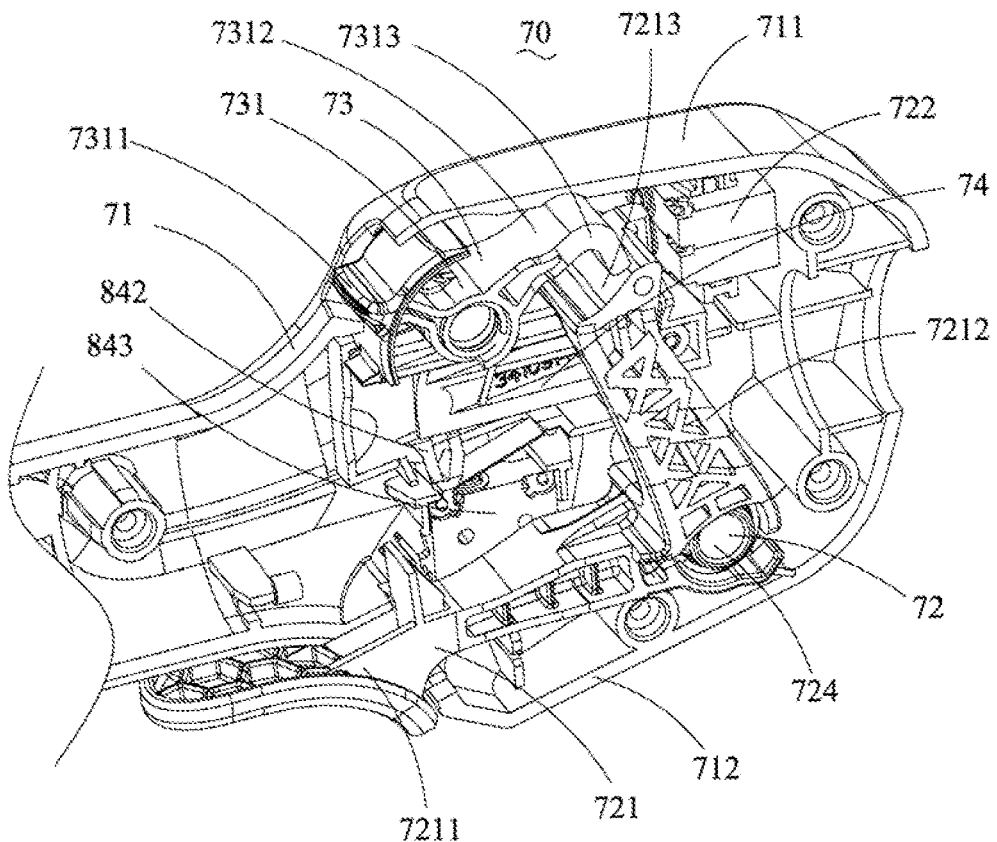
FIG. 11 is a schematic view of an internal structure of a handle assembly in another embodiment.

Please refer to FIG. 11, it shows a handle assembly 70 in another embodiment of the disclosure. The handle assembly 70 includes a handle shell 71, a starting unit 72, a locking unit 73 and a reversing unit 74. The handle arm 7211 of the trigger 721 penetrates the bottom wall 712 of the handle shell 71 for the user to hold. The trigger arm 7212 of the trigger 721 is located in the handle shell 71 and matches with the starting micro switch 722. The pushing arm 7311 of the locking handle 731 passes through the top wall 711 of the handle shell 71 for the user to operate, and the locking arm 7312 of the locking handle 731 is located in the handle shell 71 and matches with the trigger arm 7212. An end of the locking arm 7312 close to the trigger arm 7212 can be provided with a buckle part 7313. When the locking unit 73 is in the locked state, the buckle part 7313 buckles the end of the trigger arm 7212 away from the second pivot 724. When the locking unit 73 is in the unlocked state, the buckle part 7313 and the trigger arm 7212 are separated. A guide wall 7213 is provided on the side of the trigger arm 7212 facing the buckle part 7313. When the trigger 721 is in the open state, the buckle part 7313 is in contact with the guide wall 7213. When the trigger 721 is converted from the open state to the closed state, the buckle part 7313 slides along the guide wall 7213, so that the trigger 721 is reset. The reversing micro switch 843 is located below the sliding direction of the sliding block 842.

Figure 12:
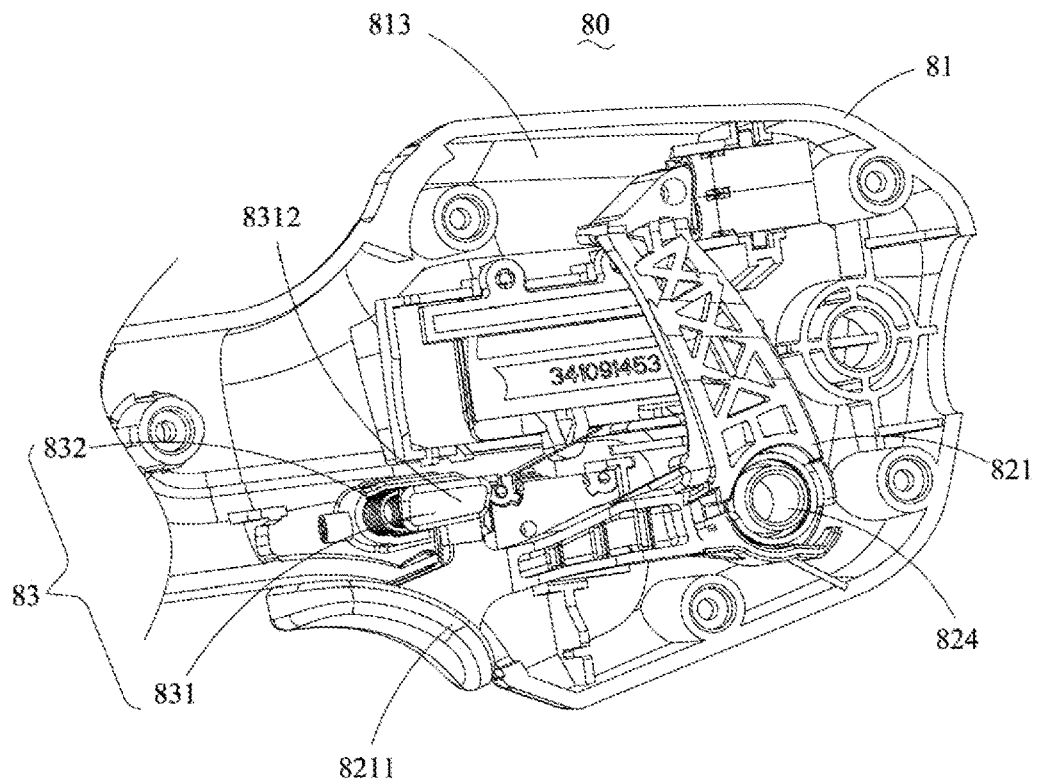
FIG. 12 is a schematic view of an internal structure of a handle assembly of a third embodiment.

Please refer to FIG. 12. FIG. 12 is a handle assembly 80 according to yet another embodiment of the disclosure. The handle assembly 80 includes a locking unit 83. The locking unit 83 includes a locking handle 831 slidably mounted on the handle shell 81 and a reset elastic component 832.

Figure 13:
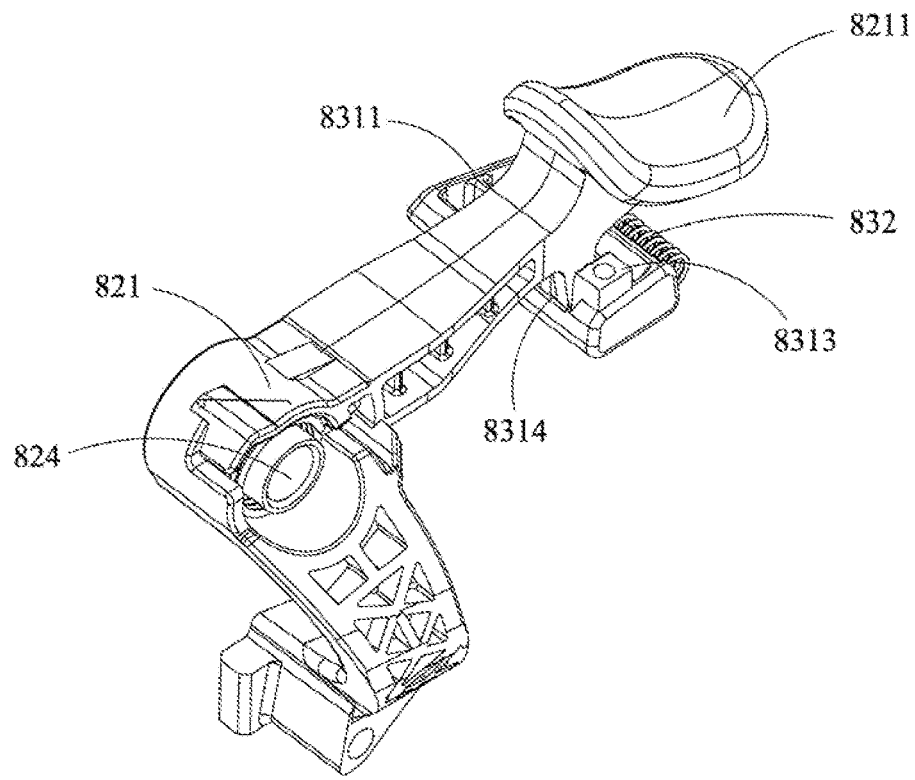
FIG. 13 is a schematic view of the match of a trigger and a locking handle of the handle assembly shown in FIG. 12.

Please refer to FIG. 13, the locking handle 831 includes a pushing arm 8311 and a locking arm 8312. The pushing arm 8311 passes through the side wall 813 of the handle shell 81 for the user to operate. The locking arm 8312 is located in the handle shell 81 and matches with the handle arm 8211. The locking arm 8312 is provided with a limiting part 8313 and a relief groove 8314. When the locking unit 83 is in the locked state, the limiting part 8313 is in contact with the handle arm 8211 so that the trigger 821 cannot rotate around the second pivot 824. When the locking unit 83 is in the unlocked state, the relief groove 8314 faces the trigger 821 so that the trigger 821 can rotate around the second pivot 824.

The earth auger provided by the disclosure can passively trigger the brake assembly when the earth auger is out of control due to the blocked rotation, thereby effectively avoiding accidents and improving operational safety. In summary, the disclosure has provides following beneficial effects: when the earth auger is out of control due to the blocked rotation, the brake assembly is passively triggered, which effectively avoids accidents and improves operational safety.

The above description is only a preferred embodiment of the disclosure and an explanation of the applied technical principles, and those skilled in the art should understand that the scope of the disclosure is not limited to the technical solution formed by the specific combination of the above technical features such as the technical solution formed through the features mentioned above replaced by the technical features disclosed in this disclosure (but not limited to) with similar functions.

Besides the technical features described in the specification, the remaining technical features are known to those skilled in the art. In order to highlight the innovative features of the disclosure, the rest of the technical features will not be repeated here.

What is claimed is:

1. An earth auger, comprising:
a supporting assembly,
a drill pipe assembly including a drill pipe,
a driving assembly arranged on the supporting assembly to drive the drill pipe assembly to work, and
a brake assembly including a trigger component that brakes the driving assembly and a brake lever connected through a first pivot and matched with the trigger component, wherein a projection part of the brake lever on a plane perpendicular to an axis of the drill pipe is located outside a projection of the supporting assembly on the plane perpendicular to the axis of the drill pipe, wherein
the supporting assembly comprises a bracket and the bracket is provided with a grip cover,
the supporting assembly further comprises a supporting platform on which a torque bearing component is arranged, the driving assembly is arranged on the supporting assembly, and a torque transmission component is arranged on the driving assembly,
the driving assembly comprises a connecting seat, a case and a driving motor which are arranged on the supporting platform, the torque transmission component is arranged on the connecting seat, and the torque transmission component and the torque bearing component match with each other to bear at least part of the shear force between the supporting assembly and the driving assembly.

2. The earth auger according to the claim 1, wherein the earth auger further comprises a handle assembly, the handle assembly is arranged on the supporting assembly and comprises:
a handle shell,
a starting unit including a trigger connected to the handle shell through a second pivot and a starting micro switch,
a locking unit, wherein
when the locking unit is in a locked state, the locking unit locks the trigger,
when the locking unit is in an unlocked state, the locking unit is separated from the trigger and the trigger rotates around the second pivot to trigger the starting micro switch, and
a reversing unit including a reversing micro switch, a sliding rail and a sliding block, wherein the sliding block is arranged on a side wall of the handle shell.

3. The earth auger according to the claim 1, wherein the drill pipe comprises a drill shaft and a spiral drill vane arranged on the drill shaft, and
the drill pipe assembly comprises:
a splitter plate, a center of which is provided with a shaft hole matched with the drill shaft, wherein the splitter plate is arranged on the drill shaft through the shaft hole and the splitter plate abuts against a lower end of the spiral drill vane.

4. The earth auger according to the claim 3, wherein the splitter plate is provided with a drainage unit and the drainage unit is rotationally symmetrical with respect to the shaft hole.

5. The earth auger according to the claim 1, wherein an air deflector and a partition are arranged in the case, the driving motor is provided with heat dissipation blades and the heat dissipation blades are located at an end away from the drill pipe assembly.

6. The earth auger according to the claim 1, wherein the supporting platform is provided with the brake lever.

7. The earth auger according to the claim 6, wherein the supporting platform is provided with a limiting component matched with the brake lever to limit a rotation range of the brake lever.

8. The earth auger according to the claim 6, wherein the brake lever is arranged below the supporting platform.

9. The earth auger according to the claim 6, wherein the brake lever comprises a rigid lever and a flexible lever and the flexible lever is located at an end of the rigid lever away from the first pivot.

10. The earth auger according to the claim 9, wherein the rigid lever bends and extends from an end close to the supporting platform to the flexible lever, which makes the rigid lever be Z-shaped.

11. The earth auger according to the claim 9, wherein the flexible lever covers the rigid lever.

12. The earth auger according to the claim 9, wherein the rigid lever is provided with a resisting arm that matches with the trigger component and the resisting arm and the flexible lever are located on different sides of the first pivot.

13. The earth auger according to the claim 9, wherein a projection of the rigid lever on the plane perpendicular to the axis of the drill pipe is located within the projection of the supporting assembly on the plane perpendicular to the axis of the drill pipe.

14. The earth auger according to the claim 9, wherein a projection of the flexible lever on the plane perpendicular to the axis of the drill pipe is a first projection, the projection of the supporting assembly on the plane perpendicular to the axis of the drill pipe is a second projection, and the first projection is at least partially outside the second projection.

15. The earth auger according to the claim 14, wherein the part of the first projection located outside the second projection is located on one side of an operator.

16. The earth auger according to the claim 1, wherein the brake assembly is further provided with a first elastic component that matches with the brake lever, when the brake lever is in a first state, the brake lever is in contact with the trigger component, the trigger component is triggered to brake the driving assembly and the first elastic component is elastically deformed, when the brake lever is released, the brake lever is reset under an action of the first elastic component, the brake lever is in a second state and separated from the trigger component, and a rotation direction of the brake lever from the second state to the first state is the same as a rotation direction of the earth auger during normal operation.

17. An earth auger, comprising:

a supporting assembly, a drill pipe assembly including a drill pipe, a driving assembly arranged on the supporting assembly to drive the drill pipe assembly to work, and a brake assembly including a trigger component that brakes the driving assembly and a brake lever connected through a first pivot and matched with the trigger component, wherein when a drill of the earth auger is blocked, the brake lever is in contact with an operator, so that the brake lever triggers the trigger component and controls the driving assembly to brake, wherein the supporting assembly comprises a bracket and the bracket is provided with a grip cover, the supporting assembly further comprises a supporting platform on which a torque bearing component is arranged, the driving assembly is arranged on the supporting assembly, and a torque transmission component is arranged on the driving assembly, the driving assembly comprises a connecting seat, a case and a driving motor which are arranged on the supporting platform, the torque transmission component is arranged on the connecting seat, and the torque transmission component and the torque bearing component match with each other to bear at least part of the shear force between the supporting assembly and the driving assembly.

* * * * *